United States Patent [19]

Mulasmajic

[11] 3,734,565

[45] May 22, 1973

[54] ANTI-FRICTION MAGNETIC WHEEL

[76] Inventor: Dzemal Mulasmajic, 338 Pleasant Hill Boulevard, Palatine, Ill. 60067

[22] Filed: Dec. 22, 1971

[21] Appl. No.: 210,923

Related U.S. Application Data

[63] Continuation-in-part of Ser. No. 175,940, Aug. 30, 1971.

[52] U.S. Cl. ............301/5 R, 104/148 MS, 152/17, 301/136, 280/93, 308/10
[51] Int. Cl. ........B60b 3/00, B60b 19/00, B60b 9/00
[58] Field of Search..........................301/5, 133, 136; 152/1, 17; 335/206, 207, 284; 104/148 MS; 308/10

[56] References Cited

UNITED STATES PATENTS

| | | | |
|---|---|---|---|
| 408,465 | 8/1889 | Dewey | 104/148 MS |
| 833,635 | 10/1906 | Rogers | 104/148 MS |
| 3,125,964 | 3/1964 | Silverman | 104/148 MS |
| 2,351,424 | 6/1944 | Hansen | 308/10 |
| 3,493,274 | 2/1970 | Emslie | 308/10 |

*Primary Examiner*—Richard J. Johnson
*Assistant Examiner*—Reinhard Eisenzopf
*Attorney*—Carlton Hill, Benjamin H. Sherman, Charles F. Meroni, J. Arthur Gross et al.

[57] ABSTRACT

A magnetic wheel for supporting a vehicle employs a permanent magnet or an electromagnet in the shape of a ring which is journalled for rotation about a shaft. The shaft is loosely coupled to the frame of the vehicle for vertical movement by means of a member which positions a permanent magnet or an electromagnet within the ring which is poled to repel the ring. The wheel is adapted for steering by providing that the loose coupling includes a pivotal coupling and by providing a lever arm for connection to a steering mechanism, such as a rack and pinion mechanism.

2 Claims, 7 Drawing Figures

PATENTED MAY 22 1973 3,734,565
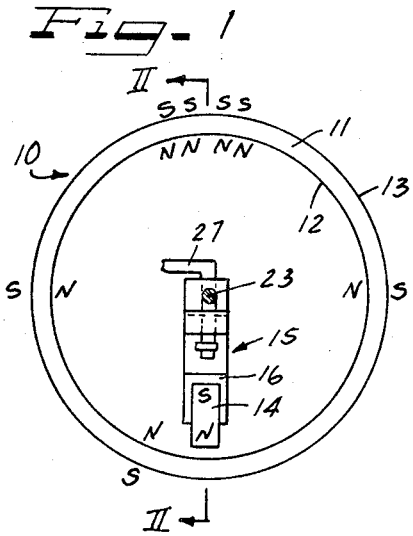
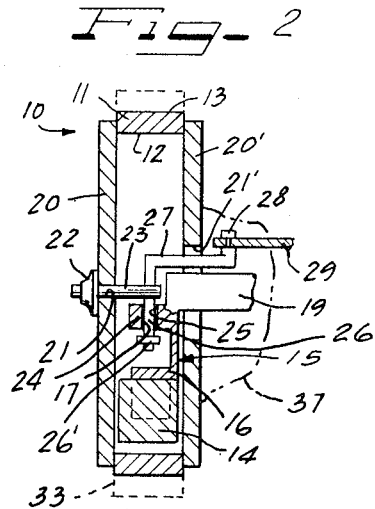
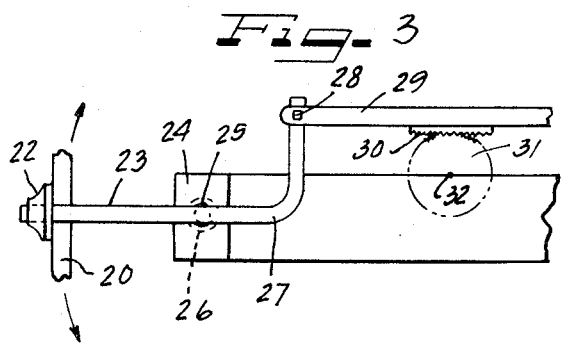
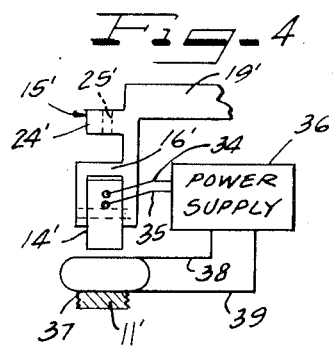
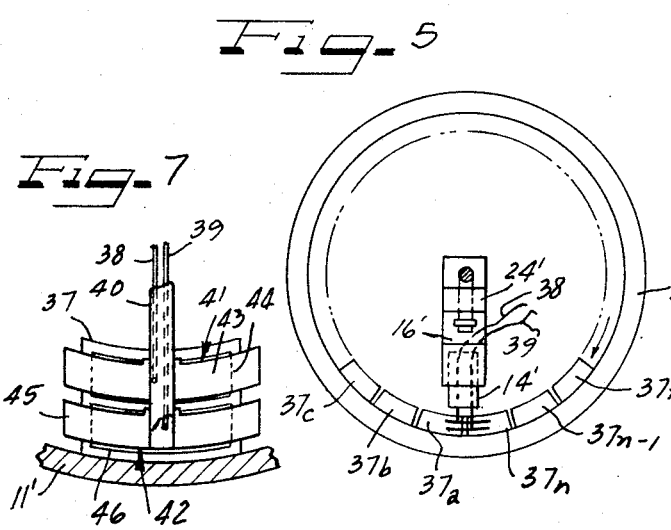
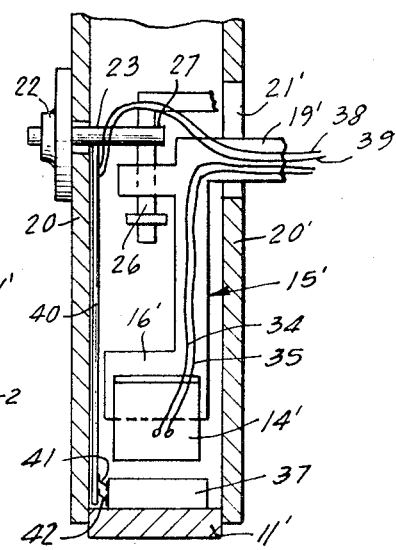

3,734,565

ANTI-FRICTION MAGNETIC WHEEL

CROSS REFERENCE TO RELATED APPLICATIONS

This application is a continuation-in-part of my earlier application, Ser. No. 175,940, filed Aug. 30, 1971.

BACKGROUND OF THE INVENTION

1. Field of the Invention

This invention relates to wheels and is more particularly concerned with the provision of a wheel for magnetically supporting a vehicle.

2. Description of the Prior Art

The art of magnetism in general has taken particular cognizance of the many benefits offered through the utilization of the forces of attraction and repulsion provided by magnets. These forces have been utilized to great advantage in magnetic bearings, for example. However, magnetic bearing structures require a design which may become quite complicated in that it is desired to maintain the rotating mechanism aligned with respect to its axis of rotation. In the field of transportation, there have been several attempts to utilize magnetic bearing structures to relieve and support loads on, for example, railway cars. These techniques have generally employed the provision of electromagnets having many winding turns in order to provide sufficient lifting forces for the vehicle. In transportation systems, there is also the difficulty of feeding the electromagnets by means of rails or the like.

SUMMARY OF THE INVENTION

The primary object of the present invention is to provide a magnetic wheel of simple construction for supporting vehicles, the wheel, according to a feature of the invention, being rotatable about an axis which is not fixed, and which is rendered free for vertical movement with respect to the associated vehicle by means of a unique wheel to frame coupling.

It is a still further object of the invention to provide a magnetic wheel that is freely rotatable about a horizontal axis for movement of the associated vehicle and further freely pivotal about a vertical axis for steering the associated vehicle.

BRIEF DESCRIPTION OF THE DRAWING

Other objects, features and advantages of the invention, its organization, construction and operation will be best understood from the following detailed description of an embodiment thereof taken in conjunction with the accompanying drawing, in which:

FIG. 1 is an elevational view of a magnetic wheel constructed in accordance with the principles of the present invention;

FIG. 2 is a sectional view of the wheel of FIG. 1 taken substantially along the parting line II—II of FIG. 1;

FIG. 3 is a top plan view of a steering mechanism which may be employed with the wheel of FIGS. 1 and 2; and FIGS. 4, 5, 6 and 7 are partial elevation sectioned and fragmentary views of the apparatus of FIGS. 1 and 2 wherein electromagnets are employed, FIGS. 6 and 7 specifically showing means for maintaining movable electrical contact and compensating for skew of the annular magnetic means with respect to the longitudinal axis of the vehicle encountered during steering movements.

DESCRIPTION OF THE PREFERRED EMBODIMENT

In FIG. 1 there is illustrated a wheel 10 which comprises a ring 11 magnetized across its thickness with its inner surface 12 and its outer surface 13 being at opposite magnetic polarities, for example, north and south poles, respectively. A permanent magnet 14 is disposed within the ring 11 and is magnetized to have, for example, a north pole at its lower side and a south pole at its upper side, whereby the permanent magnet 14 is repelled from the permanent magnet 11.

Referring to FIG. 2, a more detailed view of the apparatus of FIG. 1 is illustrated. The permanent magnet 14 is mounted within the magnetic ring 11 by means of a member 15 having an arm 16 for receiving the magnet 14 which may be secured by any suitable means. The member 15 also includes an arm 19 for attachment to the associated vehicle, and is made of nonmagnetic material.

Also shown in FIG. 2, but not in FIG. 1, is a nonmagnetic disc 20 which may be secured to the edge of the ring 11 by any suitable means. The disc 20 includes an aperture 21 and carries a bearing 22 for rotatably mounting a shaft 23. With the bearing 22 fixed to the disc 20, the ring 11 is journalled for rotation about the shaft 23. A similar nonmagnetic disc 20' with an aperture 21' and a flexible boot 37 may be utilized as a sealing means to prevent foreign manner from entering the ring 11. The member 15 includes a further arm 24 having a bore 25 with a bushing 17 therein for receiving a pin, machine screw or the like 26 which is secured to the shaft 23. The pin 26 and the bore 25 are dimensioned so as to permit relative vertical movement between the member 15 and the shaft 23 as forces of loading of the vehicle are changed. The part 26' will stop overloading before the magnet 14 touches the ring 11.

The bore 25 and the pin 26 may be shaped to restrict movement about a vertical axis thereof, but they may also be shaped to form a pivot about such vertical axis and the wheel 10 may be further provided with apparatus for steering the associated vehicle. Such apparatus may advantageously include a lever 27 which is pivotally connected at 28 to a steering linkage 29. In FIG. 3, this apparatus is illustrated for use with a rack and pinion mechanism wherein a rack 30 is carried on the steering linkage 29 and a pinion 31 is rotatably mounted for movement about an axis 32 whereby the elements 29, 27 and 23 pivot about vertical axes defined by the elements 26 and 28 to pivot the disc 20 and, accordingly, the ring 11 of the wheel 10. The rack 30 is of a width which will permit relative vertical movement of the pinion 31.

As illustrated in phantom in FIG. 2, the wheel 10 may be provided with a tire or the like 33 which is shaped to conform to the supporting surface. The supporting surface mentioned above may be any usual land surface including railway rails; however, the present invention when utilized for railway type applications, obviates the necessity for rails in that the diameter of the ring 11 is substantial with respect to the small concentrated areas of magnetic repulsion between the ring 11 and the magnet 14 so that it appears as a flat surface and rotation thereof is, in effect, a continuous rail laying process. The substantially flat inner surface 12 of the ring 11 with respect to the magnet 14, and the width of the magnet 14 with respect to the width of the ring 11 permits an extensive arc of pivoting about the pin 26 without experiencing substantial changes in the forces of repulsion in that the ring 11 appears to the magnet 14 as a substantially flat surface in all directions.

Referring to FIGS. 4 and 5, a variation of the above structure is illustrated wherein a member 15' of similar structure with respect to the member 15 is provided for supporting an electromagnet 14' by means of an arm arrangement 16'. The electromagnet 14' includes terminals for connection to a power supply 36 by way of a pair of conductors 34, 35. The power supply 36 may advantageously be carried by the associated vehicle or, if desired, the power supply 36 may be extended to the vehicle by means of a rail system in a manner known per se.

The ring 11 may be a permanent magnet as discussed above, but may also advantageously be provided as an electromagnet as schematically indicated in FIG. 4 by the coil 37 and the connections 38, 39 to the power supply 36. In FIG. 5 the connections 38, 39 are illustrated as depending from the arm 16' as a pair of commutator-type contacts for sliding engagement with a plurality of coils 37a, 37b .... 37n carried on the ring 11'. The number of coils connected in circuit with the power supply and the spacing of the coils are to be determined in accordance with the application, loading, etc. of the apparatus embodying the invention. Also, any desired combination of permanent magnets and electromagnets may be employed to fulfill the magnetic repulsion requirements of the apparatus 11', 14, 14', 37, 37a, 37b .... 37n.

In FIG. 5 the conductors 38, 39 have been schematically illustrated to show their association with and connection to the electromagnets. FIGS. 6 and 7 provide a more detail showing of the electrical connections to the electromagnets and the means for supporting the connection elements.

In FIG. 6 a member 40 is secured to and depends from the shaft 23. The member 40 may advantageously be of tubular construction to guide and shield the electrical conductors 38, 39. The conductors 38, 39 terminate at the lower end of the member 40 in spring type contacts 41 and 42 for sliding engagement with the electromagnets 37.

The sliding contact with the electromagnets is illustrated in greater detail in FIG. 7 wherein an electromagnet 37 is illustrated as having plate like electrical terminals 44 and 46 which are engaged by respective contact elements 43 and 45. Preferably, the terminals 44 and 46 extend substantially the arcuate length of the electromagnet 37 and are separated from each other a distance sufficient to permit relative vertical movement upon loading between the pin 26 and the bore 25 while preventing contact between nonrespective ones of the elements 43, 45 and 44, 46. The length of the contacts 43, 45 is such that at least two electromagnets will be contacted at the same time in order to maintain a substantially constant magnetic field as rotation of the wheel 10 moves the gaps between the terminals of adjacent magnets past the contacts 43, 45.

During times when the wheel 10 is pivoted about the pin 26, the path of travel defined by the wheel along the supporting surface is at an angle to the longitudinal axis of the vehicle. Therefore, fixation of the apparatus which supports the electrical contacts to apparatus, such as the shaft 23, and which pivots with the electromagnets is preferred over fixation to chassis supported apparatus such as the member 15' in order to prevent excessive relative movement between, wear of and strain of the contacting elements which would occur during such times of relative skew. The conductors 38, 39 could be guided by means of separate fixed tubes or a branched tube structure to contact the electromagnets on opposite sides; however, the illustrated structure is more simple and more easily provided. The spring contacts 43, 45 may be constructed of resilient electrical spring contact material; in contrast thereto or in combination therewith, the tubular member 40, or a nontubular member with the conductors 38 and 39 attached thereto, may be constructed so as to provide the necessary spring contact resiliency.

Since a wheel constructed according to the present invention is substantially free of friction, a low power drive may be employed to drive the vehicle, such as a jet, propeller or friction wheel drive.

Although I have described my invention by reference to a particular illustrative embodiment thereof, many changes and modifications of my invention may become apparent to those skilled in the art without departing from the spirit and scope thereof, and it is to be understood that I intend to include within the patent warranted hereon all such changes and modifications as may reasonably and properly be included within the scope of my contribution to the art.

I claim:

1. A magnetic wheel comprising:
   an electromagnetic ring having an inner surface and an outer surface and magnetized in a direction extending from one of said surfaces to the other;
   a disc connected to one edge of said ring and including an aperture which is concentric with the axis of said ring;
   a bearing carried on said disc and a shaft having one end thereof extending through said aperture and mounted in said bearing for rotation of said disc and ring thereabout and another end disposed within said ring;
   a magnet and means for connection to a vehicle frame mounting said magnet within said ring below said shaft and adjacent said inner surface, said magnet having a magnetic polarity such that a repelling force is provided between said magnet and said ring, said mounting means including an arm extending below said shaft and having a bore therein; and
   a pin depending from said shaft and extending through said bore for permitting free movement between said magnet and said ring in response to loading changes of the vehicle.

2. An antifriction magnetic wheel comprising:
   annular magnetic means including a metal ring having inner and outer surfaces, and a plurality of annularly disposed electromagnets on the inner surface of said metal ring energizible to provide a magnetic field directed substantially perpendicular to said surfaces of said ring;
   a disc connected to one edge of said ring and including an aperture which is concentric with the axis of said ring;
   a bearing carried on said disc and a shaft having one end thereof extending through said aperture and mounted in said bearing for rotation of said disc and ring thereabout and another end disposed within means for sequentially connecting said electromagnets to an electrical supply including a member fixed to said shaft and electrical contacts carried by said member for slidably engaging said electromagnets;

a magnet and means for connection to a vehicle frame mounting said magnet within said ring below said shaft and adjacent said annular magnetic means, and magnet having a magnetic polarity such that a repelling force is provided between said magnet and said annular magnetic means, said mounting means including an arm extending below said shaft and having a bore therein; and a pin depending from said shaft and extending through said bore for permitting free movement between said magnet and said ring in response to loading changes of the vehicle.

* * * * *